United States Patent
Lou et al.

(10) Patent No.: US 10,516,974 B2
(45) Date of Patent: Dec. 24, 2019

(54) METHOD FOR EQUIPMENT NETWORKING AND OUTPUTTING BY EQUIPMENT, AND EQUIPMENT

(71) Applicant: Beijing Xiaoniao Tingting Technology Co., LTD., Beijing (CN)

(72) Inventors: Xiaolei Lou, Beijing (CN); Jian Xing, Beijing (CN); Weijie Li, Beijing (CN)

(73) Assignee: Beijing Xiaoniao Tingting Technology Co., LTD., Beijing (CN)

( * ) Notice: Subject to any disclaimer, the term of this patent is extended or adjusted under 35 U.S.C. 154(b) by 0 days.

(21) Appl. No.: 16/532,694

(22) Filed: Aug. 6, 2019

(65) Prior Publication Data
US 2019/0364394 A1    Nov. 28, 2019

Related U.S. Application Data

(63) Continuation of application No. 15/910,671, filed on Mar. 2, 2018, now Pat. No. 10,433,121.

(30) Foreign Application Priority Data

Mar. 2, 2017    (CN) .......................... 2017 1 0121745

(51) Int. Cl.
| | |
|---|---|
| *H04B 7/00* | (2006.01) |
| *H04W 4/08* | (2009.01) |
| *H04W 4/80* | (2018.01) |
| *H04W 8/00* | (2009.01) |
| *H04L 29/08* | (2006.01) |
| *H04R 5/02* | (2006.01) |

(52) U.S. Cl.
CPC ........... *H04W 4/08* (2013.01); *H04L 67/1061* (2013.01); *H04W 4/80* (2018.02); *H04W 8/005* (2013.01); *H04R 5/02* (2013.01); *H04R 2420/07* (2013.01)

(58) Field of Classification Search
CPC ........... H04W 4/06; H04W 4/08; H04W 4/80; H04W 8/005; H04W 40/12; H04W 40/40248; H04W 76/10; H04W 84/18; H04W 88/02; H04B 5/0025; H04B 5/0031; H04H 20/08; H04H 60/25; H04R 2420/07
USPC ..... 455/41.1, 41.2, 552.1, 553.1, 556.1, 557
See application file for complete search history.

(56) References Cited

U.S. PATENT DOCUMENTS

| | | | |
|---|---|---|---|
| 7,437,440 B2 * | 10/2008 | Manion ................... | H04L 29/06 709/223 |
| 8,189,583 B2 * | 5/2012 | LoGalbo ............... | H04W 8/186 370/228 |

(Continued)

*Primary Examiner* — Quochien B Vuong
(74) *Attorney, Agent, or Firm* — Mintz Levin Cohn Ferris Glovsky and Popeo, P.C.; Jhongwoo Peck

(57) ABSTRACT

Disclosed are methods for equipment networking, and equipment. Equipment acquires at least one of first information indicating a state of the equipment or second information indicating a state of peer equipment. The equipment determines whether a pre-set condition is met by at least one of the first information or the second information. When the pre-set condition is met by at least one of the first information or the second information, the equipment forms a group with the peer equipment. The equipment monitors data characterizing a signal transmitted by the peer equipment. When a first pre-set condition is not met by the data characterizing the signal transmitted by the peer equipment, the equipment quits the group formed with the peer equipment.

14 Claims, 13 Drawing Sheets

(56) References Cited

U.S. PATENT DOCUMENTS

| | | | |
|---|---|---|---|
| 9,294,545 B2* | 3/2016 | Desai | H04L 67/1093 |
| 9,762,662 B2* | 9/2017 | Desai | H04L 67/104 |
| 2004/0125776 A1* | 7/2004 | Haugli | H04L 12/12 |
| | | | 370/338 |
| 2013/0260688 A1* | 10/2013 | Palin | H04W 64/00 |
| | | | 455/41.2 |

* cited by examiner

METHOD FOR EQUIPMENT NETWORKING AND OUTPUTTING BY EQUIPMENT, AND EQUIPMENT

CROSS-REFERENCE TO RELATED APPLICATIONS

This is a continuation of U.S. application Ser. No. 15/910,671, filed Mar. 2, 2018, which claims priority to Chinese patent application No. 201710121745.7 filed on Mar. 2, 2017, the entire content of which is incorporated herein by reference.

TECHNICAL FIELD

The present disclosure relates to smart User Equipment, and in particular to methods for equipment networking and outputting by equipment, and equipment.

BACKGROUND

With accumulation of wealth of the society and speedup of the pace of life, there is an increasing demand for a quality yet convenient lifestyle. Great music is an essential ingredient of life. As a source of music, a speaker applies widely to life, work, study, recreation, etc. With an increasing demand, multiple speakers located at different places may have to play one audio file simultaneously. Different speakers located at one place may have to play different channels of one audio file simultaneously to perfect stereo sound. Existing speaker networking generally requires control equipment, for grouping or ungrouping a speaker using an application in the control equipment. The grouping or ungrouping cannot be achieved without the control equipment. The grouping and ungrouping of a speaker are inflexible and inconvenient in terms of operation by the user.

SUMMARY

In view of this, embodiments herein provide methods for equipment networking and outputting by equipment, and equipment.

A technical solution herein may be implemented as follows.

According to an embodiment herein, a method for equipment networking includes:

acquiring, by equipment, at least one of first information indicating a state of the equipment or second information indicating a state of peer equipment;

determining, by the equipment, whether a pre-set condition is met by at least one of the first information or the second information; and in response to determining that the pre-set condition is met by at least one of the first information or the second information, forming, by the equipment, a group with the peer equipment.

The state of the peer equipment may include data characterizing a signal transmitted by the peer equipment.

The determining, by the equipment, whether a pre-set condition is met by at least one of the first information or the second information may include: determining, by the equipment, whether a first pre-set condition is met by the data characterizing the signal transmitted by the peer equipment, and in response to determining that the first pre-set condition is met by the data characterizing the signal transmitted by the peer equipment, determining that the pre-set condition is met by the second information.

The acquiring, by the equipment, the first information indicating the state of the equipment may include: acquiring, by the equipment, the first information triggered by a first physical operation.

The acquiring, by the equipment, the second information indicating the state of the peer equipment may include: acquiring, by the equipment, the second information sent by the peer equipment according to a second physical operation on the peer equipment.

A method for outputting by equipment according to an embodiment herein includes:

detecting, by equipment, first data characterizing a signal transmitted by nearby wireless equipment;

determining, by the equipment, whether a second pre-set condition is met by the first data characterizing the signal; and in response to determining that the second pre-set condition is met by the first data characterizing the signal, generating, by the equipment, an output instruction, and outputting data according to the output instruction.

The method may further include: detecting second data characterizing the signal transmitted by the nearby wireless equipment, and determining whether a third pre-set condition is met by the second data characterizing the signal; and in response to determining that the third pre-set condition is not met by the second data characterizing the signal, generating an end instruction, and stopping outputting the data according to the end instruction.

Equipment according to an embodiment herein includes an acquiring unit, a communicating unit, and a determining unit.

The acquiring unit is arranged for: acquiring first information indicating a state of the equipment.

The communicating unit is arranged for: acquiring second information indicating a state of peer equipment.

The determining unit is arranged for: determining whether a pre-set condition is met by at least one of the first information or the second information.

The communicating unit is further arranged for: in response to determining, by the determining unit, that the pre-set condition is met by at least one of the first information or the second information, forming a group with the peer equipment.

The communicating unit may be arranged for: acquiring the second information indicating data characterizing a signal transmitted by the peer equipment.

The determining unit may be arranged for: determining whether a first pre-set condition is met by the data characterizing the signal transmitted by the peer equipment, and in response to determining that the first pre-set condition is met by the data characterizing the signal transmitted by the peer equipment, determining that the pre-set condition is met by the second information.

The acquiring unit may be arranged for: acquiring the first information triggered by a first physical operation.

The communicating unit may be arranged for: acquiring the second information sent by the peer equipment according to a second physical operation on the peer equipment.

Equipment according to an embodiment herein includes a detecting unit, a determining unit, and a controlling unit.

The detecting unit is arranged for: detecting first data characterizing a signal transmitted by nearby wireless equipment.

The determining unit is arranged for: determining whether a second pre-set condition is met by the first data characterizing the signal.

The controlling unit is arranged for: in response to determining, by the determining unit, that the second pre-set condition is met by the first data characterizing the signal, generating an output instruction, and outputting data according to the output instruction.

The detecting unit may be further arranged for: detecting second data characterizing the signal transmitted by the nearby wireless equipment.

The determining unit may be further arranged for: determining whether a third pre-set condition is met by the second data characterizing the signal.

The controlling unit is further arranged for: in response to determining, by the determining unit, that the third pre-set condition is not met by the second data characterizing the signal, generating an end instruction, and stopping outputting the data according to the end instruction.

With a method for equipment networking, a method for outputting by equipment, and equipment according to embodiments herein, equipment acquires at least one of first information indicating a state of the equipment or second information indicating a state of peer equipment. The equipment determines whether a pre-set condition is met by at least one of the first information or the second information. When the pre-set condition is met by at least one of the first information or the second information, the equipment forms a group with the peer equipment. With a technical solution according to embodiments herein, grouping of equipment may be implemented without the need of control equipment, by determining whether the pre-set condition is met by the state of the equipment, which is flexible and facilitates operation by the user, greatly improving user experience.

DETAILED DESCRIPTION

The present disclosure is to be elaborated below with reference to drawings and embodiments.

Figure 1:
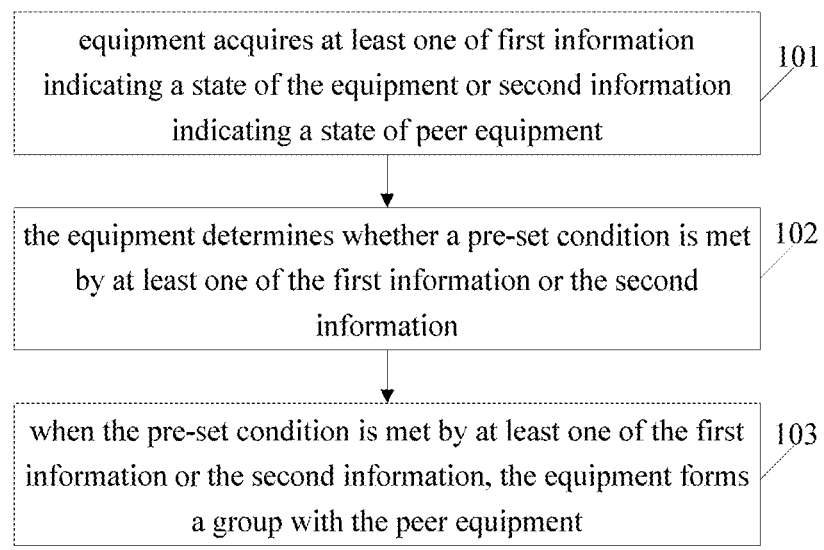
FIG. 1 is a flowchart of a method for equipment networking according to an embodiment herein.

As shown in FIG. 1, a method for equipment networking according to an embodiment herein includes steps as follows.

In step 101, equipment acquires at least one of first information indicating a state of the equipment or second information indicating a state of peer equipment.

In step 102, the equipment determines whether a pre-set condition is met by at least one of the first information or the second information.

In step 103, when the pre-set condition is met by at least one of the first information or the second information, the equipment forms a group with the peer equipment.

Both the equipment and the peer equipment may be output equipment. The output equipment may output data of a type. The output equipment may be display equipment capable of outputting image data, such as a display. The output equipment may be audio equipment capable of outputting audio data, such as a speaker. The output equipment may be equipment capable of outputting control data, such as alarm equipment. Both the equipment and the peer equipment may be audio equipment such as speakers. The equipment may be any of multiple speakers located within an area. The peer equipment may be any speaker located within the area other than the equipment.

The first information of the equipment and the second information on the peer equipment may indicate states of a same category. The state of the equipment and the state of the peer equipment may be triggered by respective physical operations on the equipment and the peer equipment. Alternatively, the state of the equipment or the peer equipment may be shown by a feature of the equipment or the peer equipment when the equipment or the peer equipment is located at different locations in the area. Networking according to an embodiment herein is to be elaborated below for the two manifestations of the state.

The condition for triggering the networking may be pre-set corresponding to a state. When the condition for triggering the networking corresponding to a state is met, the equipment may form a network with the peer equipment. That is, networking of the equipment and the peer equipment may be implemented by determining the state of the equipment of the equipment and/or the state of the peer equipment as well as the pre-set condition, without the need of third-party control equipment. Thus, the equipment and the peer equipment may output same audio data. Namely, the peer equipment and the equipment may play an audio simultaneously. The equipment and the peer equipment may output different audio data. The different audio data may be data on different channels of one audio file. The different audio data may be audio data of independent audio files.

A wireless connection herein may be implemented using wireless communication technology such as Wireless-Fidelity (Wi-Fi), Bluetooth (BT), etc.

With a technical solution according to embodiments herein, grouping of equipment may be implemented without the need of control equipment, by determining whether the pre-set condition is met by the state of the equipment, which is flexible and facilitates operation by the user, greatly improving user experience.

Figure 2:
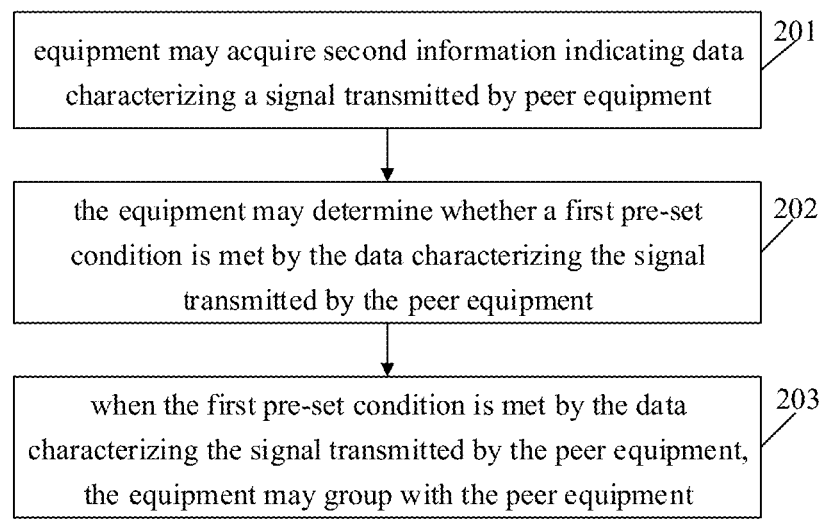
FIG. 2 is a flowchart of a method for equipment networking according to an embodiment herein.

As shown in FIG. 2, a method for equipment networking according to an embodiment herein may include steps as follows.

In step 201, equipment may acquire second information indicating data characterizing a signal transmitted by peer equipment.

In step 202, the equipment may determine whether a first pre-set condition is met by the data characterizing the signal transmitted by the peer equipment.

In step 203, when the first pre-set condition is met by the data characterizing the signal transmitted by the peer equipment, the equipment may group with the peer equipment, such that the peer equipment may output data same as data output by the equipment.

Both the equipment and the peer equipment may support establishing a connection via a mode of wireless communication. The mode of wireless communication may be Wi-Fi, BT, infrared, etc. The data characterizing the signal may characterize a signal transmitted by Wi-Fi, BT, infrared, etc. The data characterizing the signal may be strength, a frequency, a phase, etc., of the signal. The signal may be a sound wave, ultrasound, etc.

The equipment networking according to the embodiment may be implemented automatically using the data characterizing the inter-equipment signal. The data characterizing the signal may be the strength of the signal. The equipment may acquire the second information indicating the strength of the signal transmitted by the peer equipment. With BT, the equipment may acquire the second information indicating the strength of the signal transmitted by the peer equipment, as follows. A BT function of the equipment may be enabled. The equipment may serve as a BT initiator and scan to discover BT equipment at a fixed interval. After the BT function of the peer equipment has been enabled, the peer equipment may be discovered. Having scanned and discovered the peer equipment, the equipment may acquire information on the peer equipment, such as a name and an identifier (ID) of the peer equipment, and the strength of a BT signal transmitted by the peer equipment.

The equipment may determine whether the pre-set condition is met by at least one of the first information or the second information as follows. The equipment may determine whether the first pre-set condition is met by the data characterizing the signal transmitted by the peer equipment. When the first pre-set condition is met by the data characterizing the signal transmitted by the peer equipment, the equipment may determine that the pre-set condition is met by the second information. The first pre-set condition may be pre-set corresponding to the data characterizing the signal. The data characterizing the signal may be the strength of the signal. A first threshold for triggering networking may be pre-set in the equipment (namely, any equipment to be networked). When the strength of the signal transmitted by the peer equipment as acquired by the equipment has reached the first threshold, the equipment may determine that the first pre-set condition is met by the peer equipment. The equipment may group with the peer equipment, such that both the equipment and the peer equipment are in the same network. Namely, the peer equipment may play an audio same as that played by the equipment. Alternatively, the equipment and the peer equipment may output different audio data. The different audio data may be data on different channels of one audio file. The different audio data may be audio data of independent audio files.

The equipment may group with the peer equipment as follows. The equipment may send a grouping request to the peer equipment. The grouping request may include the information on the peer equipment. Having received the grouping request, the peer equipment may determine that the grouping request includes the information on the peer equipment. The peer equipment may send a response to the equipment. Having received the response sent by the peer equipment, the equipment may group with the peer equipment. The networking may be implemented by Wi-Fi, BT, etc.

Figure 3:
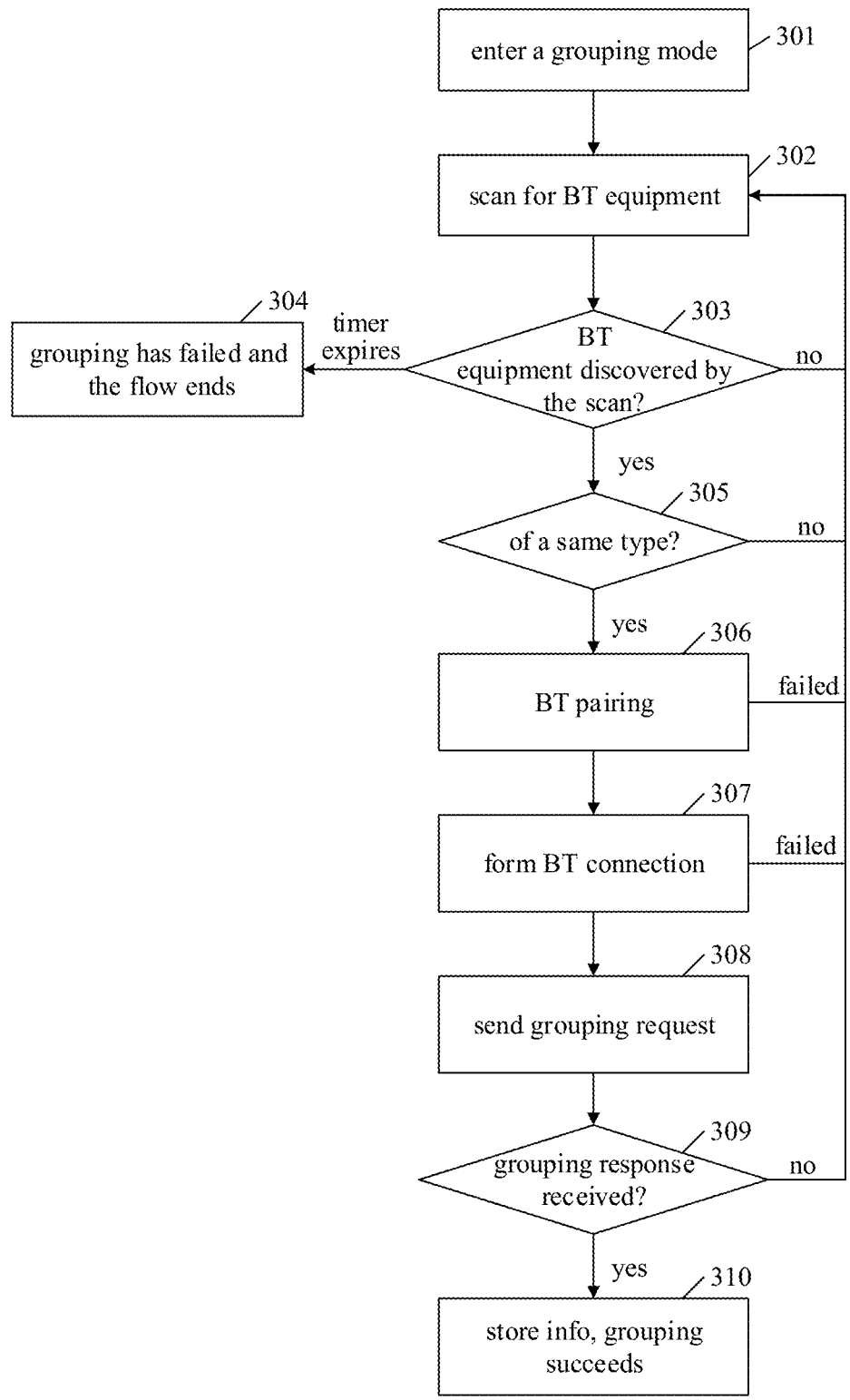
FIG. 3 is a flowchart of a method for equipment networking according to an embodiment herein.

As shown in FIG. 3, a method for equipment networking by BT according to an embodiment herein may include steps as follows.

In step 301, both equipment and peer equipment may enter a grouping mode.

In step 302, the equipment may scan for BT equipment.

In step 303, the equipment may determine whether BT equipment has been discovered by the scan. BT equipment discovered by the scan may be referred to as peer equipment. If peer equipment has been discovered, the flow may go to step 305. Otherwise if no peer equipment has been discovered, the flow may go back to step 302 to re-scan for BT equipment. If no BT equipment has been discovered by the scan upon expiration of a timer period, the flow may go to step 304 to indicate that grouping has failed and the flow may end.

In step 305, the equipment may determine whether the BT equipment is of a type same as that of the equipment. If so, the flow may go to step 306. Otherwise, the flow may go back to step 302.

In step 306, the equipment may perform BT pairing. When the BT pairing has failed, the flow may go back to step 302.

In step 307, a BT connection between the equipment and the peer equipment may be established. When BT connection establishment has failed, the flow may go back to step 302.

In step 308, after the BT connection between the equipment and the peer equipment has been established, the equipment may send a grouping request to the peer equipment.

In step 309, the equipment may determine whether a grouping response has been received. If a grouping response has been received, the flow may go to step 310. Otherwise if no grouping response has been received, the flow may go back to step 302.

In step 310, the equipment may store information, and determine that the grouping is successful. The flow may end.

The equipment may determine to enter the grouping mode when determining that the strength of the signal transmitted by the peer equipment has reached the first threshold. Equipment may enter the grouping mode according to another trigger, such as by a trigger of a functional key (grouping key). The grouping key may be physical or virtual. The grouping key may be triggered by a pre-defined key triggering operation such as a single click, a double click, a long press, etc. The long press may be a touch of duration longer than pre-set duration. The pre-set duration may be of 2s, etc. Equipment may enter the grouping mode triggered by detecting a physical operation, such as rocking, a swing, a tap, etc., of the equipment.

The equipment serving as a BT initiator may serve as master speaker equipment. The peer equipment in a BT discoverable state may serve as slave speaker equipment. The equipment may scan nearby BT equipment. When BT equipment has been discovered by the scan, step 305 to step 310 may be executed. When no BT equipment has been discovered by the scan, the flow may go back to step 302 to re-scan for BT equipment. When the scan (including the re-scan) has lasted longer than the pre-set period (e.g., 10s), it means that the scan has expired, and the flow may go to step 304 to indicate that grouping has failed and the flow may end.

BT equipment discovered by the scan may be filtered for BT equipment of the type same as that of the equipment. The equipment may determine whether the BT equipment is of the type same as that of the equipment via first three bits of a Media Access Control (MAC) address of the BT equipment discovered by the scan. When the BT equipment discovered by the scan (referred to as peer equipment) is of the type same as that of the equipment, BT pairing and BT connection establishment may be performed. In case either the BT pairing or the BT connection establishment has failed, the flow may go back to step 302 to re-scan for BT equipment.

The equipment may send a grouping message to the peer equipment according to the established BT connection. The grouping message may include a grouping request and a MAC address of the equipment. Having received the grouping message, the peer equipment may return, to the equipment, a grouping response corresponding to the grouping request. The grouping response may include information on the peer equipment. The information on the peer equipment may include at least one of the name of the peer equipment, information on the ID of the peer equipment, such as a number of the peer equipment, or the MAC address of the peer equipment. Having received the grouping response sent by the peer equipment within a pre-set period of time, the equipment may store the information on the peer equipment. The equipment is now grouped with the peer equipment successfully.

Likewise, peer equipment in a BT discoverable state may enter the grouping mode according to a trigger of a grouping key. The grouping key may be physical or virtual. The grouping key may be triggered by a pre-defined key triggering operation such as a single click, a double click, a long press, etc. The peer equipment may enter the grouping mode triggered by detecting a physical operation, such as rocking, a swing, a tap, etc., of the peer equipment. In case the peer equipment is of the type same as that of the equipment and the BT pairing is successful, the peer equipment may receive a grouping message sent by the equipment. The grouping message may include at least one of a grouping request, the MAC address of the equipment, and information on an ID of the equipment. Having acquired the grouping message, the peer equipment may store the MAC address of the equipment and the information on the ID of the equipment, and send a response to the equipment. The response may include information on the peer equipment. The information on the peer equipment may include at least one of the name of the peer equipment, information on the ID of the peer equipment, such as a number of the peer equipment, or the MAC address of the peer equipment. Thus, grouping of the peer equipment with the equipment completes.

After the equipment has formed the group with the peer equipment, the equipment may monitor the data characterizing the signal transmitted by the peer equipment. When the first pre-set condition is not met by the data characterizing the signal transmitted by the peer equipment, the equipment may quit the group formed with the peer equipment.

The data characterizing the signal may be the strength of the signal. After the equipment has formed the group with the peer equipment, the equipment may monitor the strength of the signal transmitted by the peer equipment. When the strength of the signal is smaller than a second threshold, the equipment may quit the group formed with the peer equipment.

After being networked with the peer equipment, the equipment may perform scan to acquire the strength of the signal transmitted by the peer equipment. When the strength of the signal is smaller than the second threshold, it may be determined that the first pre-set condition is not met by the data characterizing the signal transmitted by the peer equipment, and the equipment may quit the group formed with the peer equipment. The second threshold may be identical to the first threshold. The second threshold may be different from the first threshold. The second threshold may be smaller than the first threshold.

Figure 4:
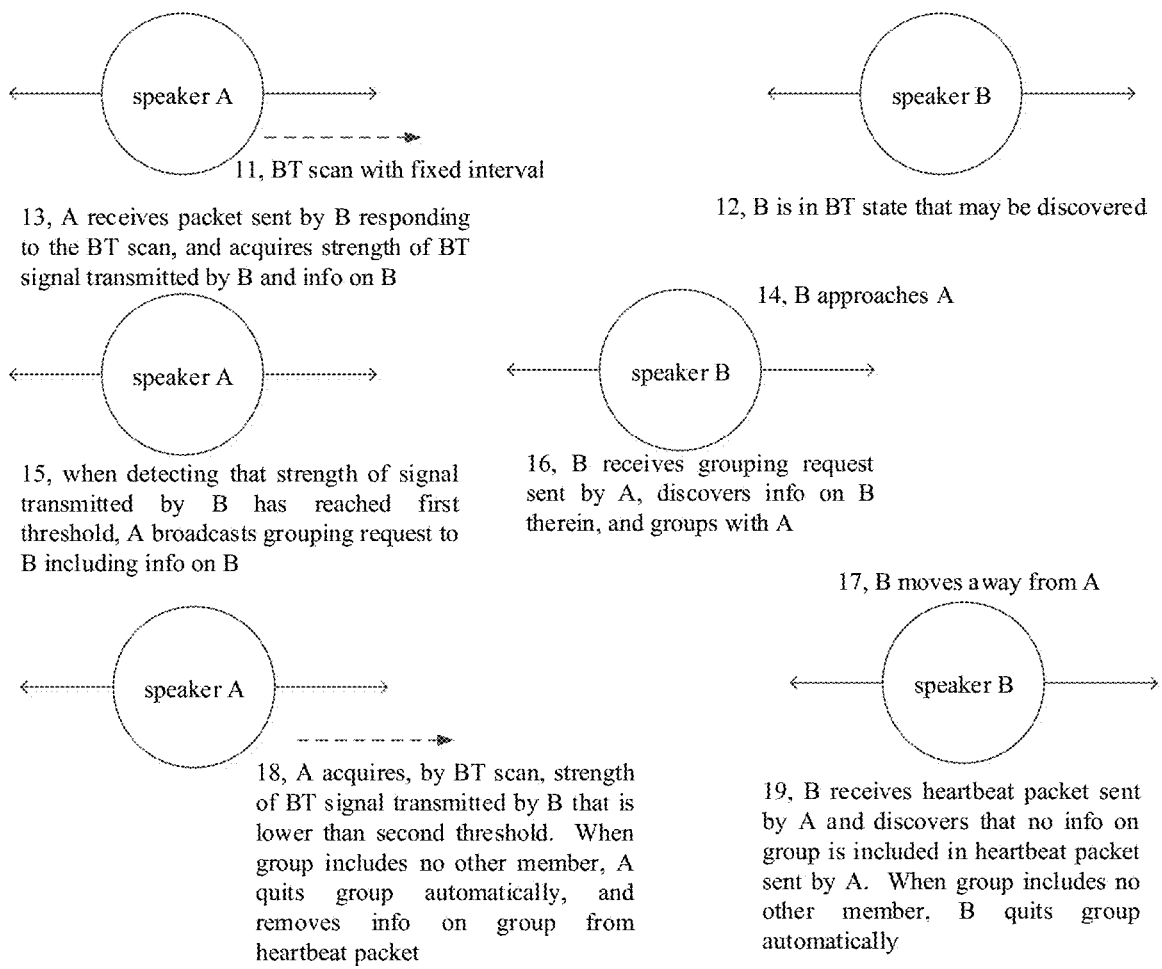
FIG. 4 is a diagram of applying a method for equipment networking according to an embodiment herein.

The equipment may be grouped with the peer equipment by broadcast/multicast, as follows. The equipment may broadcast/multicast data. Having received responding data returned by the peer equipment, the equipment may form a group with the peer equipment. The responding data may include the information on the peer equipment. The method for equipment networking according to an embodiment herein is illustrated below. FIG. 4 is a diagram of applying a method for equipment networking according to an embodiment herein. As shown in FIG. 4, equipment may be a speaker. A speaker A and a speaker B are to be networked with each other. In step 11, after the BT function of the speaker A has been enabled, the speaker A may perform BT scan at a fixed interval. The speaker A may serve as a master speaker. In step 12, after the BT function of the speaker B has been enabled, the speaker B may be in a BT discoverable state. The speaker B may serve as a slave speaker. In step 13, the speaker A may discover the speaker B by the BT scan, receive a packet sent by the speaker B in response to the BT scan, and acquire the strength of the BT signal transmitted by the speaker B and the information on the speaker B included in the responding packet/response. The strength of the BT signal transmitted by the speaker B may be yet to reach the first threshold. In step 14, the speaker B may approach the speaker A. In step 15, the speaker A may scan for the speaker B at the pre-set interval to acquire a packet sent by the speaker B in response to the BT scan to acquire the strength of the BT signal transmitted by the speaker B. Having monitored that the strength of the BT signal transmitted by the speaker B reaches the first threshold, the speaker A may generate information on a group. The information on the group may include an ID of the group. The ID of the group may include at least one of a name of the group, a number of the group, etc. The speaker A may send a grouping request to the speaker B by broadcasting a data packet. The broadcast data packet may be the broadcast data. The grouping request may include the information on the group and the information on the speaker B. In step 16, the speaker B may receive the grouping request sent by the speaker A, determine that the grouping request includes the information on the speaker B, store the information on the group included in the grouping request, and sends responding data to the speaker A. Thus, grouping of the speaker B with the speaker A completes.

Each of the speaker A and the speaker B may inform, by a heartbeat packet sent at a fixed frequency (every 10s, for example), any other networked audio equipment, of the state per se. After the speaker A and the speaker B have been networked with each other, the heartbeat packet may include the information on the group.

In step 17, the speaker B may move away from the speaker A. In step 18, the speaker A may scan for the speaker B at the pre-set interval to acquire a packet sent by the speaker B in response to the BT scan to acquire the strength of the BT signal transmitted by the speaker B. The speaker A may monitor that the strength of the BT signal transmitted by the speaker B is lower than the second threshold. When the group includes no member speaker other than the speaker A and the speaker B, the speaker A may quit the group automatically, remove the information on the group from the heartbeat packet, and send the heartbeat packet. The second threshold may be identical to the first threshold. The second threshold may be smaller than the first threshold. In step 19, the speaker B may receive the heartbeat packet sent by the speaker A, determine that the heartbeat packet include no information on the group, and quit the group automatically when the group includes no member speaker other than the speaker B.

The equipment may send a grouping request to the peer equipment. The grouping request may include the information on the peer equipment. Having received a response sent by the peer equipment, the equipment may group with the peer equipment. Alternatively, the equipment may broadcast data. Having received responding data returned by the peer equipment, the equipment may form a group with the peer equipment. The responding data may include the information on the peer equipment. That is to say, the equipment may form a group with the peer equipment by sending a grouping request and/or by broadcast. A group of multiple equipment may be formed both by sending a grouping request and by broadcast. For example, equipment 1 and equipment 2 may be grouped together by sending a grouping request, while equipment 2, equipment 3, and equipment 4 may be grouped together by broadcast.

The equipment may send a grouping request to the peer equipment as follows. The equipment may be triggered to send the grouping request to the peer equipment. Third-party control equipment may be triggered to send the grouping request to the peer equipment. The equipment may be triggered to send the grouping request to the peer equipment according to a trigger of a functional key on the equipment and/or a voice instruction received by the equipment.

An application (APP) for grouping and managing grouped equipment may be pre-set in the equipment. After the APP has been started, the equipment may display an APP interface provided with a functional key for grouping. The equipment may send the grouping request upon detecting an operation that triggers the grouping key. The application may also be configured in third-party control equipment such as a mobile terminal/UE, a Personal Computer (PC), etc. The grouping request may be sent by the third-party control equipment. The equipment may send the grouping request according to a voice instruction received.

With a technical solution according to embodiments herein, grouping of equipment may be implemented without the need of control equipment, facilitating operation by the user, greatly improving user experience. Grouping may be implemented automatically when detecting that the strength of the wireless signal transmitted by peer/opposite equipment reaches the first threshold. Ungrouping may be automatically implemented when detecting that the strength of the wireless signal transmitted by the networked peer equipment is smaller than the second threshold. Such flexible grouping/ungrouping facilitates operation by the user.

Figure 5:
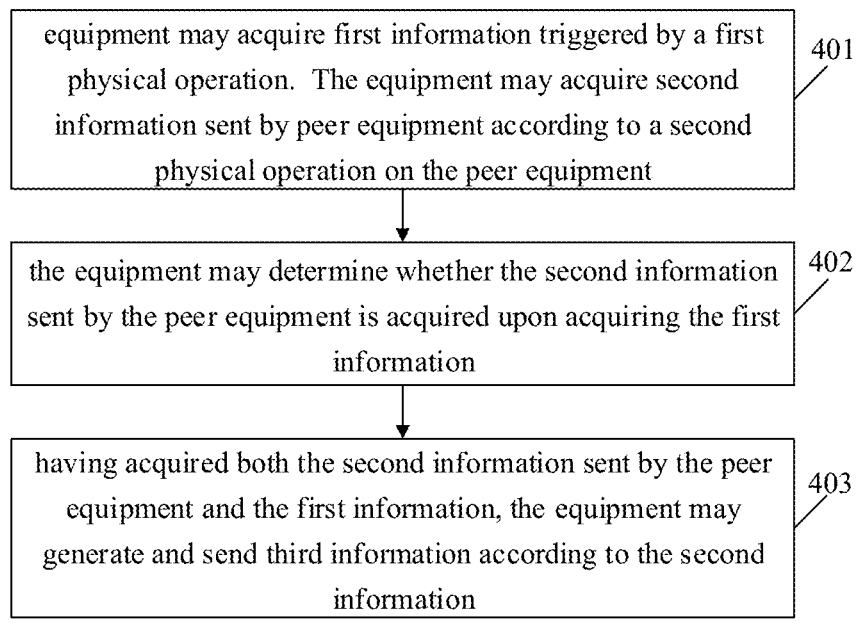
FIG. 5 is a flowchart of a method for equipment networking according to an embodiment herein.

As shown in FIG. 5, a method for equipment networking according to an embodiment herein may include steps as follows.

In step 401, equipment may acquire first information triggered by a first physical operation. The equipment may acquire second information sent by peer equipment according to a second physical operation on the peer equipment. The second information may include an ID of a group.

In step 402, the equipment may determine whether the second information sent by the peer equipment is acquired upon acquiring the first information.

In step 403, having acquired both the second information sent by the peer equipment and the first information simultaneously, the equipment may generate and send third information according to the ID of the group in the second information. The third information may include the ID of the group, such that the equipment may be grouped with the peer equipment.

Both the equipment and the peer equipment may support establishing a connection via a mode of wireless communication. The mode of wireless communication may be Wi-Fi, BT, infrared, etc.

Equipment may be networked automatically according to a same physical operation performed on respective equipment, such as rocking, a swing, a tap, etc., of respective equipment. Sensing equipment capable of collecting a physical operation, such as an accelerometer, a pressure sensor, etc., may be pre-set respectively in the equipment and the peer equipment. A physical operation performed on equipment may be detected via a pre-set sensing equipment. The equipment may acquire the first information triggered by a first physical operation via a pre-set sensor. The first information may indicate the first physical operation being performed on the equipment. The peer equipment may detect a second physical operation via a pre-set sensor and generate the second information according to the second physical operation. The second information may include at least the information on the group. The information on the group may include the ID of the group such as the name of the group, the unique number of the group, etc.

Each of the equipment and the peer equipment may inform, by a heartbeat packet sent at a fixed frequency (every 10s, for example), any other networked equipment of the state per se. That is, having the detected second physical operation, the peer equipment may generate the second information including the information on the group, and send the second information by a heartbeat packet. Having the detected first physical operation, the equipment may generate the information on the group and send the information on the group by a heartbeat packet. The equipment may determine whether the second information sent by the peer equipment is acquired upon acquiring the first information to determine whether the second physical operation is being performed on the peer equipment while the first physical operation is being performed on the equipment. The equipment may acquire both the second information sent by the peer equipment and the first information simultaneously. This means that grouping of the equipment with the peer equipment may be triggered by determining that the second physical operation is being performed on the peer equipment while the first physical operation is being performed on the equipment. Having received the information on the group sent by the peer equipment, the equipment may set a heartbeat packet (i.e., the third information) including the information on the group, and send the heartbeat packet. Having received the heartbeat packet, the peer equipment may determine that the heartbeat packet includes the generated information on the group, and send a response of success to the equipment indicating that the equipment is now grouped with the peer equipment successfully.

After the equipment has formed the group with the peer equipment, the equipment may quit the group formed with the peer equipment upon once again acquiring the first information triggered by the first physical operation. Alternatively, the equipment may quit the group formed with the peer equipment upon acquiring fourth information sent by the peer equipment according to the second physical operation. The fourth information may indicate that the peer equipment is no longer a member of the group.

The equipment has been networked with the peer equipment via a physical operation of rocking. Upon detecting another physical operation of rocking, the equipment may quit the network automatically, and generate and send a heartbeat packet indicating that the equipment is not in the network. Having received the heartbeat packet, the peer equipment may determine, according to the heartbeat packet, that the equipment is not in the network. When the network includes no equipment other than the peer equipment, the peer equipment may quit the network as well, and remove the information on the group from a heartbeat packet to be sent. Upon detecting another physical operation of rocking, the peer equipment may quit the network automatically, and generate and send a heartbeat packet (i.e., the fourth information) indicating that the peer equipment is not in the network. Having received the heartbeat packet, the equipment may determine, according to the heartbeat packet, that the peer equipment is not in the network. When the network includes no other equipment, the equipment may quit the network as well, and remove the information on the group from a heartbeat packet to be sent.

Figure 6:
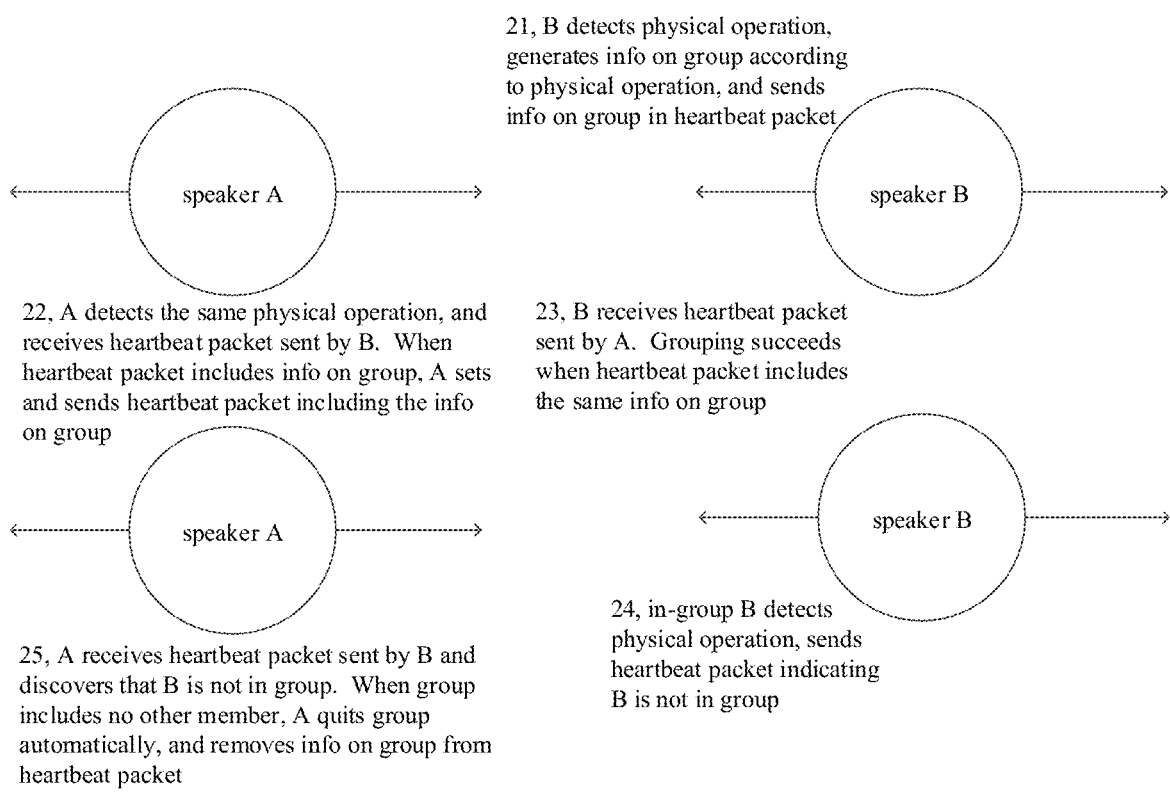
FIG. 6 is a diagram of applying a method for equipment networking according to an embodiment herein.

FIG. 6 is a diagram of applying a method for equipment networking according to an embodiment herein. As shown in FIG. 6, equipment may be a speaker. A speaker A and a speaker B are to be networked with each other. In step 21, the speaker B may detect a physical operation, generate information on a group according to the physical operation, and send the information on the group in a first heartbeat packet. The information on the group may include at least one of a name of the group or a unique number of the group. In step 22, when receiving the first heartbeat packet including the information on the group while detecting the same physical operation, the speaker A may include the information on the group in a second heartbeat packet to be sent, and send the second heartbeat packet. In step 23, having received the second heartbeat packet sent by the speaker A and determined that the second heartbeat packet includes the information on the group, the speaker B may determine that the grouping is successful, and send a response of success to the speaker A.

Each of the speaker A and the speaker B may inform, by a heartbeat packet sent at a fixed frequency (every 10s, for example), any other networked audio equipment, of the state per se. After the speaker A and the speaker B have been networked with each other, the heartbeat packet may include the information on the group.

In step 24, While being networked with the speaker A, upon detecting the same physical operation, the speaker B may generate information indicating that the speaker B is not in the group, and send the information in a third heartbeat packet, such that the speaker B quits the network automatically. In step 25, having received the third heartbeat packet, the speaker A may determine that the speaker B is not in the group as indicated by the third heartbeat packet. When the network includes no other member speaker, the speaker A may as well quit the network automatically, and remove the information on the group from a heartbeat packet to be sent.

With a technical solution according to embodiments herein, grouping of equipment may be implemented without the need of control equipment, facilitating operation by the user, greatly improving user experience. Flexible grouping/ungrouping may be implemented according to identical physical operations performed simultaneously on equipment to be grouped, facilitating operation by the user.

Figure 7:
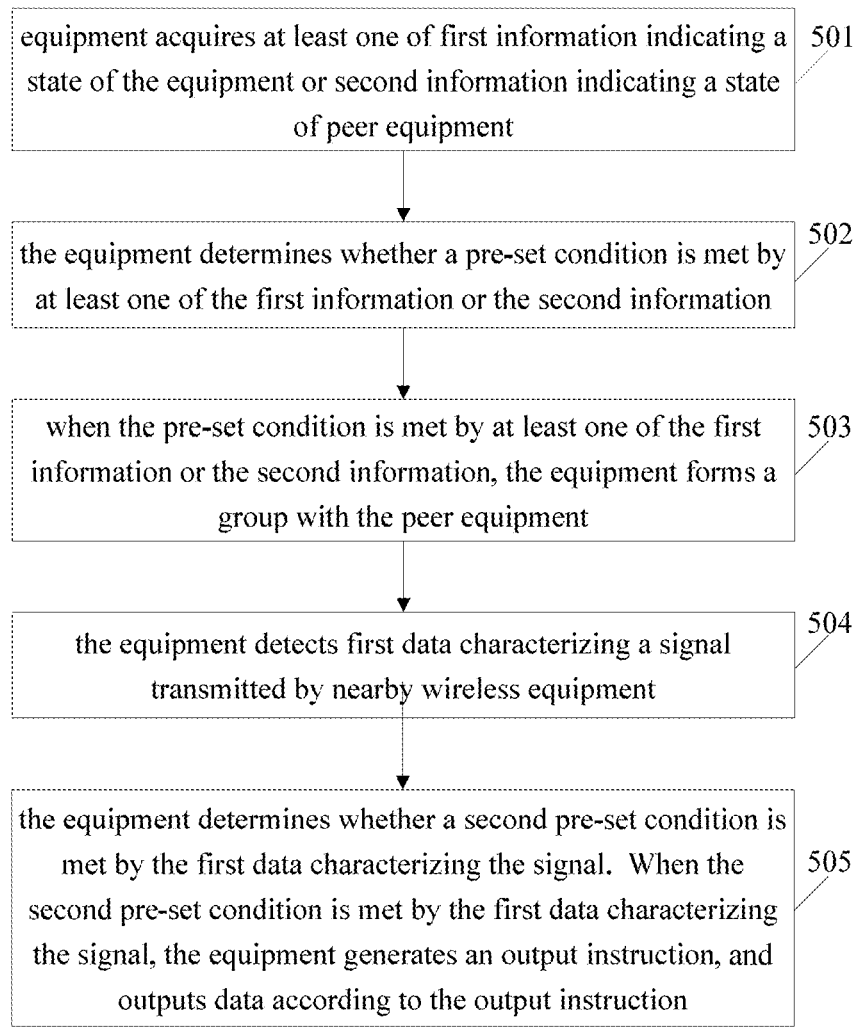
FIG. 7 is a flowchart of a method for equipment networking according to an embodiment herein.

As shown in FIG. 7, a method for equipment networking according to an embodiment herein may include steps as follows.

In step 501, equipment acquires at least one of first information indicating a state of the equipment or second information indicating a state of peer equipment.

In step 502, the equipment determines whether a pre-set condition is met by at least one of the first information or the second information.

In step 503, when the pre-set condition is met by at least one of the first information or the second information, the equipment forms a group with the peer equipment, such that the peer equipment may output data same as data output by the equipment.

In step 504, the equipment detects first data characterizing a signal transmitted by nearby wireless equipment.

In step 505, the equipment determines whether a second pre-set condition is met by the first data characterizing the signal. When the second pre-set condition is met by the first data characterizing the signal, the equipment generates an output instruction, and outputs data according to the output instruction.

Second data characterizing the signal transmitted by the nearby wireless equipment may be detected. It may be determined whether a third pre-set condition is met by the second data characterizing the signal. When the third pre-set condition is not met by the second data characterizing the signal, an end instruction may be generated. Data outputting may be stopped according to the end instruction.

Equipment may be triggered by nearby wireless equipment. The steps 504 and 505 may be implemented before or after the step 501, namely before or after the equipment grouping.

Networking of equipment and peer equipment in the steps 501 to 502 may be implemented as illustrated above, which will not be repeated here.

The wireless equipment may be equipped with a wireless communication function. The wireless equipment may be wearable equipment such as a smart watch, a smart wristband, smart glasses, etc. The wireless equipment may be a smart card, a keychain, a mobile phone, etc. The equipment may determine a distance to the wireless equipment by detecting the data characterizing the signal of certain wireless communication technology such as BT, Bluetooth Low Energy (BLE), Near Field Communication (NFC), Wi-Fi, etc. A communicating module corresponding to the wireless communication technology, such as a BT communicating module, a Wi-Fi module, an NFC module, etc., may have to be set respectively in the wireless equipment and the equipment. The data characterizing the signal may characterize a signal transmitted by Wi-Fi, BT, infrared, etc. The data characterizing the signal may be strength, a frequency, a phase, etc., of the signal.

Data characterizing the signal may indicate the strength of the signal. The equipment may determine whether the second pre-set condition is met by the first data characterizing the signal as follows. A first distance to the wireless equipment may be determined according to a first strength of the signal. It may be determined that the second pre-set condition is met by the first data characterizing the signal when the first distance is no greater than the first threshold. It may be determined whether the third pre-set condition is met by the second data characterizing the signal as follows. A second distance to the wireless equipment may be determined according to a second strength of the signal. It may be determined that the third pre-set condition is not met by the second data characterizing the signal when the second distance is greater than the second threshold. The second threshold may be identical to the first threshold. The second threshold may be different from the first threshold. The second threshold may be greater than the first threshold.

The data characterizing the signal may be the strength of the signal. When the wireless equipment approaches the equipment, the equipment may detect the first strength of the signal transmitted by the wireless equipment. The equipment may determine the first distance to the wireless equipment according to the detected first strength of the signal. When the first distance is no greater than the first threshold, the equipment may generate the output instruction, and output the data according to the output instruction. As the distance between the wireless equipment and the equipment varies, the equipment may determine the second distance to the wireless equipment according to the detected second strength of the signal. When the second distance is greater than the second threshold, the equipment may generate the end instruction, and stop outputting the data according to the end instruction.

The equipment may be audio equipment such as a speaker. The peer equipment may be wearable. The equipment may communicate with the peer equipment by BT or Wi-Fi. While being disconnected from the audio equipment, the wearable equipment worn by a user may approach the audio equipment. The wearable equipment may trigger playing of an audio file by the audio equipment by entering a sphere centered on the audio equipment with a radius of 1.5 m, for example. While being connected to the audio equipment, the wearable equipment worn by the user may move away from the audio equipment. The audio equipment may stop playing the audio file when the wearable equipment moves out of the sphere centered on the audio equipment with the radius of 1.5 m, for example.

Data characterizing the signal may indicate the frequency of the signal. The equipment may determine whether the second pre-set condition is met by the first data characterizing the signal as follows. It may be determined that the second pre-set condition is met by the first data characterizing the signal when a first frequency of the signal meets a pre-set frequency condition. It may be determined whether the third pre-set condition is met by the second data characterizing the signal as follows. It may be determined that the third pre-set condition is not met by the second data characterizing the signal when a second frequency of the signal does not meet the pre-set frequency condition. The second pre-set condition may be identical to the third pre-set condition.

The data characterizing the signal may be the frequency of the signal. The equipment may generate the output instruction and output the data according to the output instruction when the frequency of the signal transmitted by the wireless equipment matches a pre-set frequency. Upon detecting that the frequency of the signal transmitted by the wireless equipment matches no pre-set frequency, the equipment may generate the end instruction, and stop outputting the data according to the end instruction.

Audio equipment may communicate with wearable equipment worn by a user by NFC. The wearable equipment may approach the audio equipment. The wearable equipment may trigger playing of an audio file by the audio equipment by entering a sphere centered on the audio equipment with a radius of 20 cm, for example. The audio equipment may stay in the playing state after the wearable equipment has moved out of the sphere centered on the audio equipment with the radius of 20 cm, for example.

The equipment may generate the output instruction when wireless equipment gets close enough to the equipment. The equipment may also generate the output instruction when another smart UE, such as a smart phone, gets close enough to the equipment.

The equipment may be audio equipment. The audio equipment may output the data according to the output instruction. The data may be an audio file stored in the audio equipment.

The equipment may form an array group with the peer equipment. Both the equipment and the peer equipment may output the data as triggered by nearby wireless equipment approaching the equipment. The equipment may output the data identical to the data output by the peer equipment. The data may be audio data. The equipment and the peer equipment may output data on different channels of one audio file.

Figure 8A:
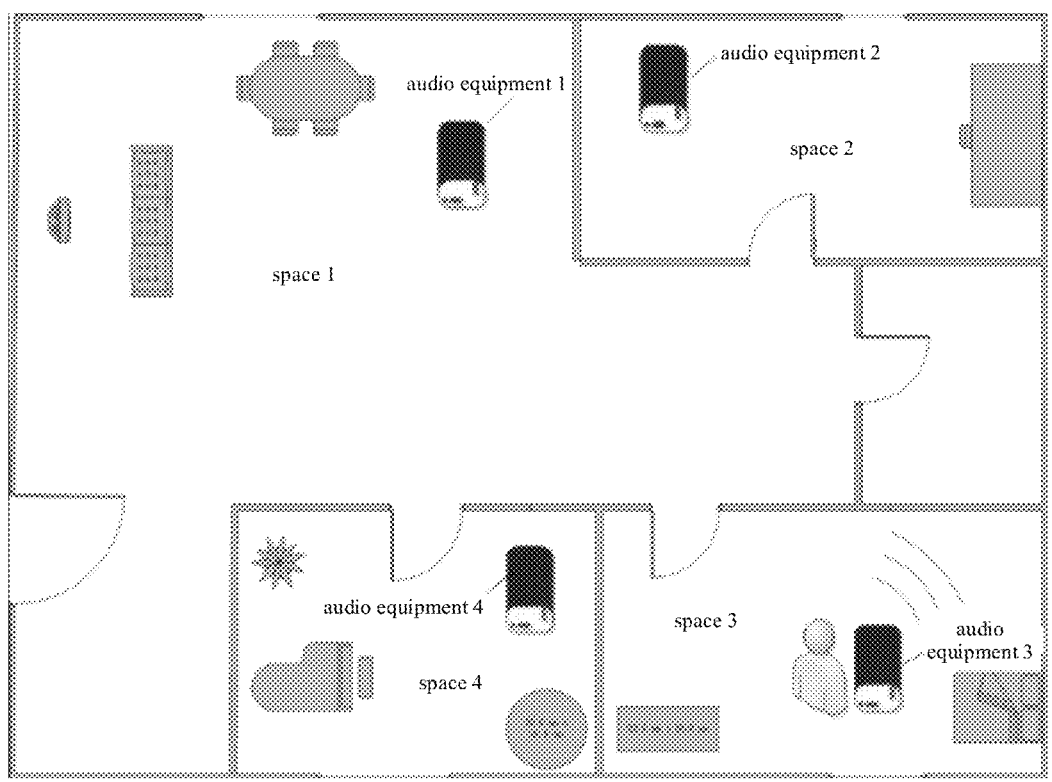
FIG. 8a and FIG. 8b are diagrams of applying a method for equipment networking according to an embodiment herein.
Figure 8B:
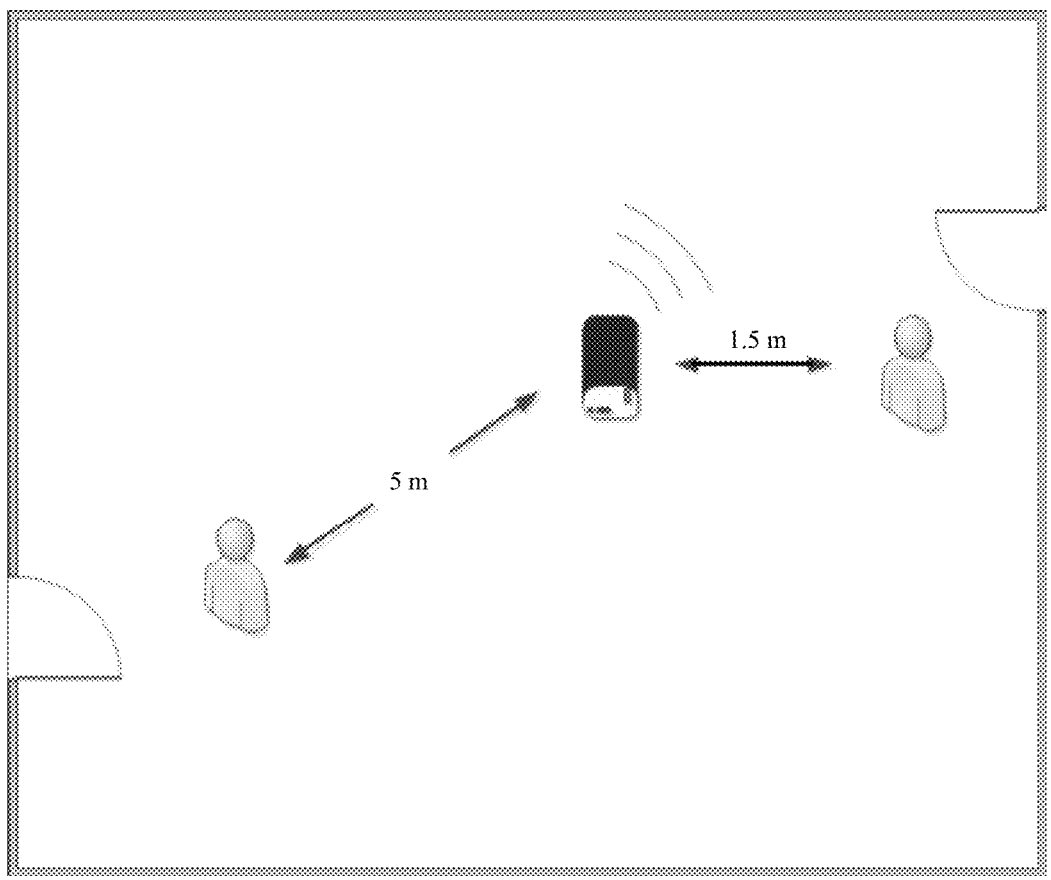

FIG. 8a and FIG. 8b are diagrams of applying a method for equipment networking according to an embodiment herein. As shown in FIG. 8a, the network may include equipment that may be located respectively in different rooms. As shown in FIG. 8a, equipment 1 may be located in space 1. The space 1 may be a living room. Equipment 2 may be located in space 2. The space 2 may be a study. Equipment 3 may be located in space 3. The space 3 may be a bedroom. Equipment 4 may be located in space 4. The space 4 may be a room for recreation. When a user wearing wearable equipment enters certain space, such as the space 3, the equipment 3 may detect that the distance to the wearable equipment is no greater than the first threshold. The first threshold may be 1.5 m. The equipment 3 may generate a playing instruction/request, thereby triggering operation of the equipment 3 to play an audio. When the user has left the room or moved away from the equipment 3, the equipment 3 may detect that the distance to the wearable equipment is greater than the second threshold. The second threshold may be 5 m. The equipment 3 may generate an end instruction, such that the equipment 3 may stop playing the audio according to the end instruction.

With a technical solution according to an aspect herein, grouping of equipment may be implemented without the need of control equipment, by determining whether the pre-set condition is met by the state of the equipment, which is flexible and facilitates operation by the user, greatly improving user experience. With a technical solution according to an aspect herein, equipment operation may be initiated or stopped as triggered by wireless equipment worn by a user, facilitating operation by the user, increasing equipment operability.

Figure 9:
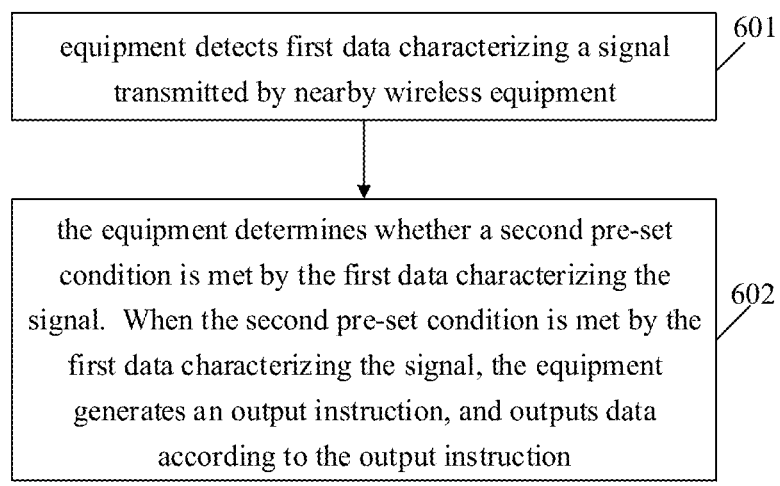
FIG. 9 is a flowchart of a method for outputting by equipment according to an embodiment herein.

As shown in FIG. 9, a method for outputting by equipment according to an embodiment herein includes steps as follows.

In step 601, equipment detects first data characterizing a signal transmitted by nearby wireless equipment.

In step 602, the equipment determines whether a second pre-set condition is met by the first data characterizing the signal. When the second pre-set condition is met by the first data characterizing the signal, the equipment generates an output instruction, and outputs data according to the output instruction.

Second data characterizing the signal transmitted by the nearby wireless equipment may be detected. It may be determined whether a third pre-set condition is met by the second data characterizing the signal. When the third pre-set condition is not met by the second data characterizing the signal, an end instruction may be generated. Data outputting may be stopped according to the end instruction.

The wireless equipment may be equipped with a wireless communication function. The wireless equipment may be wearable equipment such as a smart watch, a smart wristband, smart glasses, etc. The wireless equipment may be a smart card, a keychain, a mobile phone, etc. The equipment may determine a distance to the wireless equipment by detecting the data characterizing the signal of certain wireless communication technology such as BT, Bluetooth Low Energy (BLE), Near Field Communication (NFC), Wi-Fi, etc. A communicating module corresponding to the wireless communication technology, such as a BT communicating module, a Wi-Fi module, an NFC module, etc., may have to be set respectively in the wireless equipment and the equipment. The data characterizing the signal may characterize a signal transmitted by Wi-Fi, BT, infrared, etc. The data characterizing the signal may be strength, a frequency, a phase, etc., of the signal.

Data characterizing the signal may indicate the strength of the signal. The equipment may determine whether the second pre-set condition is met by the first data characterizing the signal as follows. A first distance to the wireless equipment may be determined according to a first strength of the signal. It may be determined that the second pre-set condition is met by the first data characterizing the signal when the first distance is no greater than the first threshold. It may be determined whether the third pre-set condition is met by the second data characterizing the signal as follows. A second distance to the wireless equipment may be determined according to a second strength of the signal. It may be determined that the third pre-set condition is not met by the second data characterizing the signal when the second distance is greater than the second threshold. The second threshold may be identical to the first threshold. The second threshold may be different from the first threshold. The second threshold may be greater than the first threshold.

The data characterizing the signal may be the strength of the signal. When the wireless equipment approaches the equipment, the equipment may detect the first strength of the signal transmitted by the wireless equipment. The equipment may determine the first distance to the wireless equipment according to the detected first strength of the signal. When the first distance is no greater than the first threshold, the equipment may generate the output instruction, and output the data according to the output instruction. As the distance between the wireless equipment and the equipment varies, the equipment may determine the second distance to the wireless equipment according to the detected second strength of the signal. When the second distance is greater than the second threshold, the equipment may generate the end instruction, and stop outputting the data according to the end instruction.

The equipment may be audio equipment such as a speaker. The peer equipment may be wearable. The equipment may communicate with the peer equipment by BT or Wi-Fi. While being disconnected from the audio equipment, the wearable equipment worn by a user may approach the audio equipment. The wearable equipment may trigger playing of an audio file by the audio equipment by entering a sphere centered on the audio equipment with a radius of 1.5 m, for example. While being connected to the audio equipment, the wearable equipment worn by the user may move away from the audio equipment. The audio equipment may stop playing the audio file when the wearable equipment moves out of the sphere centered on the audio equipment with the radius of 1.5 m, for example.

Data characterizing the signal may indicate the frequency of the signal. The equipment may determine whether the second pre-set condition is met by the first data characterizing the signal as follows. It may be determined that the second pre-set condition is met by the first data characterizing the signal when a first frequency of the signal meets a pre-set frequency condition. It may be determined whether the third pre-set condition is met by the second data characterizing the signal as follows. It may be determined that the third pre-set condition is not met by the second data characterizing the signal when a second frequency of the signal does not meet the pre-set frequency condition. The second pre-set condition may be identical to the third pre-set condition.

The data characterizing the signal may be the frequency of the signal. The equipment may generate the output instruction and output the data according to the output instruction when the frequency of the signal transmitted by the wireless equipment matches a pre-set frequency. Upon detecting that the frequency of the signal transmitted by the wireless equipment matches no pre-set frequency, the equipment may generate the end instruction, and stop outputting the data according to the end instruction.

Audio equipment may communicate with wearable equipment worn by a user by NFC. The wearable equipment may approach the audio equipment. The wearable equipment may trigger playing of an audio file by the audio equipment by entering a sphere centered on the audio equipment with a radius of 20 cm, for example. The audio equipment may stay in the playing state after the wearable equipment has moved out of the sphere centered on the audio equipment with the radius of 20 cm, for example.

The equipment may generate the output instruction when wireless equipment gets close enough to the equipment. The equipment may also generate the output instruction when another smart UE, such as a smart phone, gets close enough to the equipment.

The equipment may be audio equipment. The audio equipment may output the data according to the output instruction. The data may be an audio file stored in the audio equipment.

Equipment may pre-set a permission of wireless equipment that may access the equipment. An interface for setting the permission of wireless equipment may be pre-set in the equipment. A user may input an ID of wireless equipment that may access the equipment. Alternatively, when wireless equipment attempts access for the first time, the user may be prompted, using a prompt message, whether to allow the access. After indication that the access is allowed is received, the ID of the wireless equipment may be set as that of wireless equipment allowed to access the equipment. The permission of wireless equipment that may access the equipment pre-set in the equipment may include a list of IDs of wireless equipment. A priority of accessing the equipment may be set for an ID of respective wireless equipment in the list. Equipment may be approached simultaneously by at least two wireless equipment.

The equipment may select wireless equipment of a maximal priority according to the pre-set priorities, and generate the output instruction or the end instruction as triggered by the wireless equipment of the maximal priority that is approaching or moving away from the equipment.

With a technical solution according to embodiments herein, equipment operation may be initiated or stopped as triggered by wireless equipment worn by a user, facilitating operation by the user, increasing equipment operability.

Figure 10:
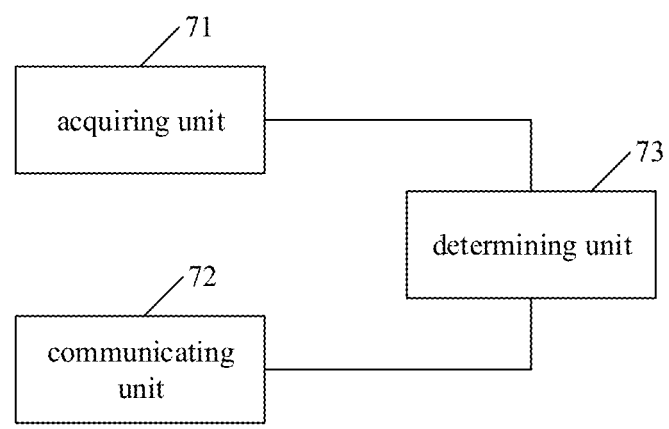
FIG. 10 is a diagram of a structure of equipment according to an embodiment herein.

As shown in FIG. 10, equipment according to an embodiment herein includes an acquiring unit 71, a communicating unit 72, and a determining unit 73.

The acquiring unit 71 is arranged for: acquiring first information indicating a state of the equipment.

The communicating unit 72 is arranged for: acquiring second information indicating a state of peer equipment.

The determining unit 73 is arranged for: determining whether a pre-set condition is met by at least one of the first information or the second information.

The communicating unit 72 is further arranged for: in response to determining, by the determining unit 73, that the pre-set condition is met by at least one of the first information or the second information, forming a group with the peer equipment, such that the peer equipment may output data same as data output by the equipment.

Those skilled in the art may know that a function implemented by a processing unit in the equipment according to an embodiment herein may be understood by referring to description relevant to the method for equipment networking. A processing unit in the equipment according to an embodiment herein may be implemented by an analog circuit implementing a function according to an embodiment herein, or by running, on a smart UE, software executing a function according to an embodiment herein.

As shown in FIG. 10, equipment according to an embodiment herein may include an acquiring unit 71, a communicating unit 72, and a determining unit 73.

The communicating unit 72 may be arranged for: acquiring the second information indicating data characterizing a signal transmitted by the peer equipment.

The determining unit 73 may be arranged for: determining whether a first pre-set condition is met by the data characterizing the signal transmitted by the peer equipment, and in response to determining that the first pre-set condition is met by the data characterizing the signal transmitted by the peer equipment, determining that the pre-set condition is met by the second information.

The communicating unit 72 may be further arranged for: in response to determining, by the determining unit 73, that the pre-set condition is met by the second information, sending a grouping request to the peer equipment, receiving a response sent by the peer equipment, and grouping with the peer equipment; and/or broadcasting/multicasting data, receiving responding data returned by the peer equipment, and forming a group with the peer equipment. The grouping request may include the information on the peer equipment. The responding data may include the information on the peer equipment.

The communicating unit 72 may be further arranged for: in response to forming the group with the peer equipment, monitoring the data characterizing the signal transmitted by the peer equipment; in response to determining that the first pre-set condition is not met by the data characterizing the signal transmitted by the peer equipment, quitting the group formed with the peer equipment.

The communicating unit 72 may be arranged for: sending the grouping request according to a trigger operation and/or by triggering third-party control equipment. The communicating unit may be triggered to send the grouping request according to a trigger of a functional key and/or a voice instruction received.

Those skilled in the art may know that a function implemented by a processing unit in the equipment according to an embodiment herein may be understood by referring to description relevant to the method for equipment networking. A processing unit in the equipment according to an embodiment herein may be implemented by an analog circuit implementing a function according to an embodiment herein, or by running, on a smart UE, software executing a function according to an embodiment herein.

As shown in FIG. 10, equipment according to an embodiment herein may include an acquiring unit 71, a communicating unit 72, and a determining unit 73.

The acquiring unit 71 may be arranged for: acquiring first information triggered by a first physical operation.

The communicating unit 72 may be arranged for: acquiring second information sent by peer equipment according to a second physical operation on the peer equipment.

The determining unit 73 may be arranged for: determining whether the communicating unit 72 acquires the second information sent by the peer equipment upon acquiring the first information by the acquiring unit 71; in response to determining that the communicating unit 72 acquires the second information sent by the peer equipment and the acquiring unit 71 acquires the first information simultaneously, determining that the pre-set condition is met by the first information and the second information.

The communicating unit 72 may be arranged for: in response to determining, by the determining unit 73, that the pre-set condition is met by the first information and the second information, generating and sending third information according to the second information, such that the equipment may be grouped with the peer equipment.

The acquiring unit 71 may be further arranged for: in response to forming the group with the peer equipment, once again acquiring the first information triggered by the first physical operation. The communicating unit 72 may be further arranged for: quitting the group formed with the peer equipment.

Alternatively, the communicating unit 72 may be further arranged for: quitting the group formed with the peer equipment in response to acquiring fourth information sent by the peer equipment according to the second physical operation. The fourth information may indicate that the peer equipment is no longer a member of the group.

Those skilled in the art may know that a function implemented by a processing unit in the equipment according to an embodiment herein may be understood by referring to description relevant to the method for equipment networking. A processing unit in the equipment according to an embodiment herein may be implemented by an analog circuit implementing a function according to an embodiment herein, or by running, on a smart UE, software executing a function according to an embodiment herein.

Figure 11:
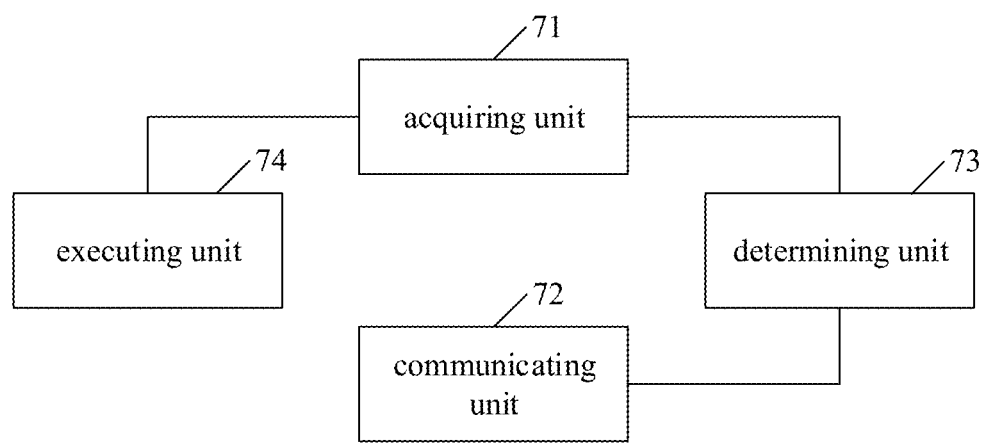
FIG. 11 is a diagram of a structure of equipment according to an embodiment herein.

As shown in FIG. 11, equipment according to an embodiment herein may include an acquiring unit 71, a communicating unit 72, a determining unit 73, and an executing unit 74.

The acquiring unit 71 is arranged for: acquiring first information indicating a state of the equipment.

The communicating unit 72 is arranged for: acquiring second information indicating a state of peer equipment.

The determining unit 73 is arranged for: determining whether a pre-set condition is met by at least one of the first information or the second information.

The communicating unit 72 is further arranged for: in response to determining, by the determining unit 73, that the pre-set condition is met by at least one of the first information or the second information, forming a group with the peer equipment, such that the peer equipment may output data same as data output by the equipment.

The acquiring unit 71 may be further arranged for: detecting data characterizing a signal transmitted by nearby wireless equipment approaching the equipment, and determining a distance to the wireless equipment according to the data characterizing the signal.

The executing unit 74 may be arranged for: in response to determining, by the acquiring unit 71, that the distance is no greater than a first threshold, generating an output instruction, and outputting data according to the output instruction.

Those skilled in the art may know that a function implemented by a processing unit in the equipment according to an embodiment herein may be understood by referring to description relevant to the method for equipment networking. A processing unit in the equipment according to an embodiment herein may be implemented by an analog circuit implementing a function according to an embodiment herein, or by running, on a smart UE, software executing a function according to an embodiment herein.

The equipment may be audio equipment, such as a speaker, a headset, etc. The determining unit 73 and the executing unit 74 in the equipment may be implemented by at least one of a Central Processing Unit (CPU), a Digital Signal Processor (DSP), a Microcontroller Unit (MCU), a Field-Programmable Gate Array (FPGA), etc., in the equipment. The acquiring unit 71 in the equipment may be implemented by a sensor for detecting a physical operation in the equipment, such as an accelerometer. The communicating unit 72 in the equipment may be implemented by a set of communicating modules (including a basic communicating kit, an operating system, a communicating module, standard interface and protocol, etc.) and a transceiver antenna.

Figure 12:
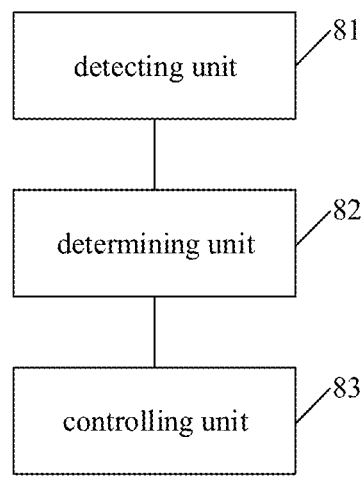
FIG. 12 is a diagram of a structure of equipment according to an embodiment herein.

As shown in FIG. 12, equipment according to an embodiment herein may include a detecting unit 81, a determining unit 82, and a controlling unit 83.

The detecting unit 81 may be arranged for: detecting first data characterizing a signal transmitted by nearby wireless equipment.

The determining unit 82 may be arranged for: determining whether a second pre-set condition is met by the first data characterizing the signal.

The controlling unit 83 may be arranged for: in response to determining, by the determining unit 82, that the second pre-set condition is met by the first data characterizing the signal, generating an output instruction, and outputting data according to the output instruction.

The detecting unit 81 may be further arranged for: detecting second data characterizing the signal transmitted by the nearby wireless equipment.

the determining unit 82 may be further arranged for: determining whether a third pre-set condition is met by the second data characterizing the signal.

the controlling unit 83 may be further arranged for: in response to determining, by the determining unit 82, that the third pre-set condition is not met by the second data characterizing the signal, generating an end instruction, and stopping outputting the data according to the end instruction.

Data characterizing the signal may indicate the strength of the signal.

The determining unit 82 may be arranged for: determining the first distance to the wireless equipment according to the first strength of the signal, and determining whether the first distance is greater than the first threshold.

The controlling unit 83 may be arranged for: in response to determining, by the determining unit 82, that the first distance is no greater than the first threshold, determining that the second pre-set condition is met by the first data characterizing the signal, generating the output instruction, and outputting the data according to the output instruction.

The determining unit 82 may be arranged for: determining the second distance to the wireless equipment according to the second strength of the signal, and determining whether the second distance is greater than the second threshold.

The controlling unit 83 may be arranged for: in response to determining, by the determining unit, that the second distance is greater than the second threshold, determining that the third pre-set condition is not met by the second data characterizing the signal, generating the end instruction, and stopping outputting the data according to the end instruction.

Data characterizing the signal may indicate the frequency of the signal.

The determining unit 82 may be arranged for: determining whether a first frequency of the signal meets a pre-set frequency condition.

The controlling unit 83 may be arranged for: in response to determining, by the determining unit 82, that the first frequency of the signal meets the pre-set frequency condition, determining that the second pre-set condition is met by the first data characterizing the signal, generating the output instruction, and outputting the data according to the output instruction.

The determining unit 82 may be arranged for: determining whether a second frequency of the signal meets the pre-set frequency condition.

The controlling unit 83 may be arranged for: in response to determining, by the determining unit 82, that the second frequency of the signal does not meet the pre-set frequency condition, determining that the third pre-set condition is not met by the second data characterizing the signal, generating the end instruction, and stopping outputting the data according to the end instruction.

Those skilled in the art may know that a function implemented by a processing unit in the equipment according to an embodiment herein may be understood by referring to description relevant to the method for equipment networking. A processing unit in the equipment according to an embodiment herein may be implemented by an analog circuit implementing a function according to an embodiment herein, or by running, on a smart UE, software executing a function according to an embodiment herein.

The equipment may be audio equipment, such as a speaker, a headset, etc. The detecting unit 81, the determining unit 82, and the controlling unit 83 may be implemented by at least one of a CPU, a DSP, an MCU, an FPGA in the wearable equipment.

Note that in embodiments herein, disclosed equipment and method may be implemented in another mode. Described equipment embodiment is merely exemplary. For example, the unit division is merely logical function division and there may be another division in actual implementation. For example, multiple units or components may be combined, or integrated into another system. Some features/characteristics may be omitted or skipped. Coupling, direct coupling, or communicational connection among the components illustrated or discussed herein may be implemented through indirect coupling or communicational connection among some interfaces, equipment, or units, and may be electrical, mechanical, or in another form.

Units described as separate components may or may not be physically separated. Components shown as units may or may not be physical units. They may be located in one place or distributed on multiple network units. Some or all of the units may be selected to achieve the effect of a solution herein as needed.

Various functional units in an embodiment herein may be integrated in one processing unit, or exist as separate units. Two or more such units may be integrated in one unit. The integrated unit may be implemented in form of hardware, or hardware plus software functional unit(s).

Those skilled in the art may understand that all or part of the steps of the embodiments may be implemented by instructing a related hardware through a program, which program may be stored in a transitory or non-transitory computer-readable storage medium. When executed, the program may execute steps including those of the embodiments. The computer-readable storage medium may be various media that can store program codes, such as mobile storage equipment, Read-Only Memory (ROM), a Random Access Memory (RAM), a magnetic disk, a CD, and/or the like.

When implemented in form of a software functional module and sold or used as an independent product, an integrated module herein may also be stored in a transitory or non-transitory computer-readable storage medium. Based on such an understanding, the essential part or a part contributing to prior art of the technical solution of an embodiment of the present disclosure may appear in form of a software product stored in storage medium, and may include a number of instructions for allowing computer equipment (such as a personal computer, a server, network equipment, and/or the like) to execute all or part of the method according to embodiments herein. The storage medium may include various media that can store program codes, such as mobile storage equipment, ROM, RAM, a magnetic disk, a CD, and/or the like.

What described are but embodiments herein and are not intended to limit the scope of the present disclosure. Any modification, equivalent replacement, and/or the like made within the spirit as well as principle of the present disclosure, as may occur to those skilled in the art, shall be included in the scope of the present disclosure. The scope of the present disclosure thus should be determined as claimed by the claims.

The invention claimed is:

1. A method for equipment networking, comprising:
acquiring, by equipment, at least one of first information indicating a state of the equipment or second information indicating a state of peer equipment;
determining, by the equipment, whether a pre-set condition is met by at least one of the first information or the second information;
in response to determining that the pre-set condition is met by at least one of the first information or the second information, forming, by the equipment, a group with the peer equipment; and
monitoring, by the equipment, data characterizing a signal transmitted by the peer equipment; in response to determining that a first pre-set condition is not met by the data characterizing the signal transmitted by the peer equipment, quitting the group formed with the peer equipment.

2. The method according to claim 1, wherein the state of the peer equipment comprises the data characterizing the signal transmitted by the peer equipment,
wherein the determining, by the equipment, whether a pre-set condition is met by at least one of the first information or the second information comprises:
determining, by the equipment, whether the first pre-set condition is met by the data characterizing the signal transmitted by the peer equipment, and in response to determining that the first pre-set condition is met by the data characterizing the signal transmitted by the peer equipment, determining that the pre-set condition is met by the second information.

3. The method according to claim 2, wherein the forming, by the equipment, a group with the peer equipment comprises at least one of:
sending, by the equipment, a grouping request to the peer equipment, the grouping request comprising information on the peer equipment; having received a response sent by the peer equipment, forming the group with the peer equipment; or
broadcasting/multicasting, by the equipment, data; having received responding data returned by the peer equipment, forming the group with the peer equipment, the responding data comprising the information on the peer equipment.

4. The method according to claim 3, wherein the sending, by the equipment, a grouping request to the peer equipment comprises at least one of:
triggering sending, by the equipment, the grouping request to the peer equipment; and
triggering sending, by third-party control equipment, the grouping request to the peer equipment,
wherein the triggering sending, by the equipment, the grouping request to the peer equipment comprises:
triggering sending, by the equipment, the grouping request to the peer equipment according to at least one of a trigger of a functional key on the equipment and a voice instruction received by the equipment.

5. The method according to claim 1, wherein the acquiring, by the equipment, the first information indicating the state of the equipment comprises: acquiring, by the equipment, the first information triggered by a first physical operation,
wherein the acquiring, by the equipment, the second information indicating the state of the peer equipment comprises: acquiring, by the equipment, the second information sent by the peer equipment according to a second physical operation on the peer equipment.

6. The method according to claim 5, wherein the determining, by the equipment, whether the pre-set condition is met by the first information and the second information comprises:
determining, by the equipment, whether the second information sent by the peer equipment is acquired upon acquiring the first information;
having acquired both the second information sent by the peer equipment and the first information simultaneously, determining, by the equipment, that the pre-set condition is met by the first information and the second information.

7. The method according to claim 6, wherein the forming, by the equipment, a group with the peer equipment comprises:
forming, by the equipment, the group with the peer equipment by generating and sending third information according to the second information.

8. The method according to claim 7, further comprising: after the forming, by the equipment, a group with the peer equipment,
quitting, by the equipment, the group formed with the peer equipment upon once again acquiring the first information triggered by the first physical operation, or
quitting, by the equipment, the group formed with the peer equipment upon acquiring fourth information sent by the peer equipment according to the second physical operation, the fourth information indicating that the peer equipment is no longer a member of the group.

9. The method according to claim 1, further comprising:
detecting, by equipment, first data characterizing a signal transmitted by nearby wireless equipment;
determining, by the equipment, whether a second pre-set condition is met by the first data characterizing the signal; and in response to determining that the second pre-set condition is met by the first data characterizing the signal, generating, by the equipment, an output instruction, and outputting data according to the output instruction.

10. Equipment, comprising:
a processor; and
memory storing instructions executable by the processor, wherein the processor is arranged for:
acquiring at least one of first information indicating a state of the equipment or second information indicating a state of peer equipment;
determining whether a pre-set condition is met by at least one of the first information or the second information;
in response to determining that the pre-set condition is met by at least one of the first information or the second information, forming a group with the peer equipment; and
monitoring data characterizing a signal transmitted by the peer equipment; in response to determining that a first pre-set condition is not met by the data characterizing the signal transmitted by the peer equipment, quitting the group formed with the peer equipment.

11. The equipment according to claim 10, wherein the processor is arranged for:
acquiring the second information indicating the data characterizing the signal transmitted by the peer equipment;
determining whether the first pre-set condition is met by the data characterizing the signal transmitted by the peer equipment, and in response to determining that the first pre-set condition is met by the data characterizing the signal transmitted by the peer equipment, determining that the pre-set condition is met by the second information.

12. The equipment according to claim 11, wherein the processor is arranged for:
sending a grouping request to the peer equipment, the grouping request comprising information on the peer equipment; having received a response sent by the peer equipment, forming the group with the peer equipment; and/or,
broadcasting/multicasting data; having received responding data returned by the peer equipment, forming the group with the peer equipment, the responding data comprising the information on the peer equipment.

13. The equipment according to claim 10, wherein the processor is arranged for:
acquiring the first information triggered by a first physical operation;
acquiring the second information sent by the peer equipment according to a second physical operation on the peer equipment.

14. The equipment according to claim 10, wherein the processor is arranged for:
detecting data characterizing a signal transmitted by nearby wireless equipment, and determining a distance to the wireless equipment according to the data characterizing the signal;
in response to determining that the distance is no greater than a first threshold, generating an output instruction, and outputting data according to the output instruction.

* * * * *